United States Patent Office 3,448,483
Patented June 10, 1969

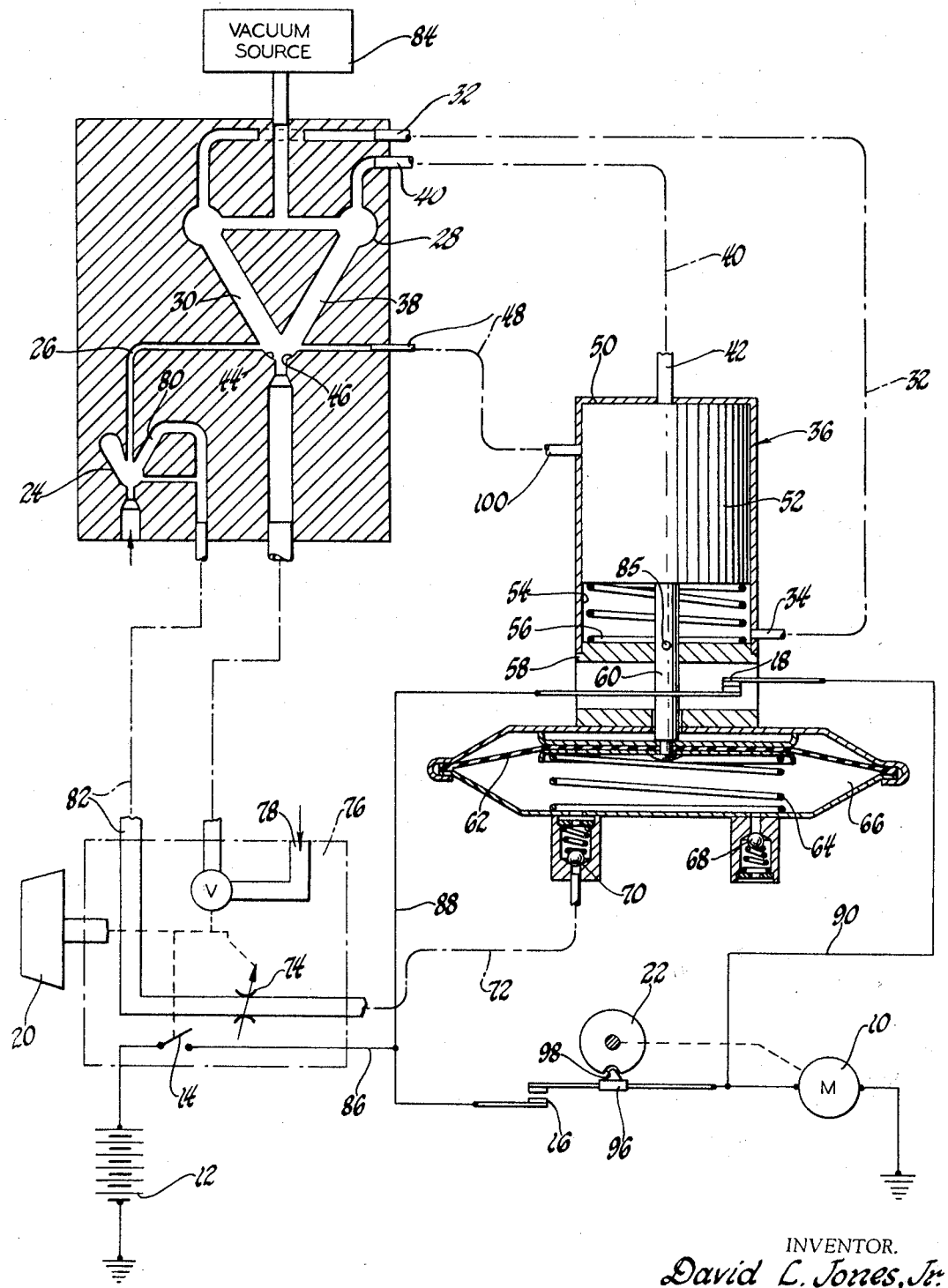

3,448,483
WINDSHIELD WIPER CONTROL
David L. Jones, Jr., Dayton, Ohio, assignor to General Motors Corporation, Detroit, Mich., a corporation of Delaware
Filed Oct. 3, 1966, Ser. No. 583,614
Int. Cl. B60s 1/02; A47l 1/02
U.S. Cl. 15—250.12     5 Claims

ABSTRACT OF THE DISCLOSURE

In a preferred form, this disclosure relates to a pulse type windshield wiping system for an automotive vehicle. The system includes a drive motor which is adapted to be intermittently energized, a first means in operative circuit with the motor to control energization and de-energization thereof and which includes an element movable between first and second positions, a fluid motor means including a member movable between first and second positions and which effects movement of the element between its positions when fluid is supplied to the opposite ends of the fluid motor means, and a control means for selectively supplying fluid from a source to the opposite ends of the fluid motor means to effect intermittent energization of the drive motor. The control means includes a first fluid amplifier having an inlet and first and second outlet legs respectively connected to opposite ends of the fluid motor means, a manual control means for connecting the inlet of the fluid amplifier with a pressure source, a second monostable fluid amplifier operatively connected with the first fluid amplifier and the fluid motor means and which is operable in response to movement of said member to its first position to shift the fluid stream flowing through the first fluid amplifier from its first leg to its second leg whereby de-energization of the drive member is effected, and means responsive to movement of the membr to its second position for rendering the second fluid amplifier inoperable to bias the fluid stream flowing through the first fluid amplifier and for shifting the fluid stream flowing through the first fluid amplifier from its second leg to its first leg which in turn effects movement of the member toward its first position in which it effects energization of the drive motor.

---

This invention relates to a windshield wiper control mechanisms and more particularly to apparatus which controls an electric windshield wiper motor to provide a pulsing wiping action.

Heretofore, the majority of pulse wiping mechanisms for vehicle windshield wipers have been fluid operated devices utilizing various types of controls to bring about the desired pulsing. In the windshield wiper art, pulse wipers have the characteristic that a windshield wiper blade makes a wiping pass across the windshield from a park position and returns. At the end of a single wiping pass, a delay takes place during which time the wiping action is arrested. After a predetermined controllable interval, the wiper is again actuated for a single pass. The wiper movement is generally of constant speed while the delay between wipes is controlled so that the frequency of wipes corresponds to the necessity therefor.

It is an object of the present invention to provide an improved pulse wiper control for use with electric windshield wipers utilizing fluid control for varying the pulsing frequency.

It is another object of the present invention to carry out the aforementioned object utilizing fluid amplifiers as the basic controller in the operation of the wiper motor.

Further objects and advantages of the present invention will be apparent from the following description, reference being had to the accompanying drawing wherein a preferred embodiment of the present invention is clearly shown.

In the drawing:

In the single figure drawing, a pulse wiping control system is diagrammatically shown.

Referring to the drawing, the wiper motor 10 is energized selectively by battery 12 through switches 14, 16 and 18. Switch 14 is an ON/OFF switch responsive to movement of dash controller 20. Switch 16 is spring loaded to the open position and is selectively closed by cam 22 constructed so as to make one complete revolution during one complete cycle of wiper operation. Switch 18 is controlled in a manner to be hereinafter described.

A mono-stable fluid amplifier 24 has an input from atmosphere in the direction of the arrow. Fluid amplifier 24 is a bias start type fluid amplifier with a normal output up leg 26 to provide a bias to bistable fluid amplifier 28. Bistable amplifier 28 is a high memory type which merely indicates that, with the removal of a biasing force, the amplifier will revert to the leg previously selected. Leg 30 of fluid amplifier 28 has an output through line 32 into inlet 34 of a pressure responsive device, generally designated by numeral 36. Leg 38 of fluid amplifier 28 has an output through line 40 to inlet 42 of pressure responsive device 36. Fluid amplifier 24 biases fluid amplifier 28 at point 44 and fluid amplifier 28 is also biased at point 46 through line 48 communicating with a chamber 50 formed above piston 52 when piston 52 moves downward in pressure responsive device 36.

Fluid responsive device 36 has an interior bore 54 along which piston 52 travels in response to a pressure increase above or below the piston. Return spring 56 acts between piston 52 and plate 58, a closure member for bore 54, to bias piston 52 toward inlet 42. One end of rod 60 engages diaphragm 62 making piston 52 responsive to the movement of diaphragm 62 to move in bore 54. The other end of rod 60 engages piston 52. Spring 64 biases diaphragm 62 toward one extreme of movement in chamber 66.

Ball check valve 68 provides a dump for fluid from chamber 66 during a downward movement of diaphragm 62. An intake ball check valve 70 communicates through line 72 with variable valve 74. Valve 74 responds to dash controller 20 to vary the input of air into valve body 76 through inlet 78 in the direction of the arrow.

Output leg 80 of fluid amplifier 24 communicates with variable valve 74 through line 82 controlling the amount of fluid flow to line 72.

In operation, piston 52 is normally in the uppermost portion of bore 54 adjacent inlet 42, dash controller 20 is turned completely off, switch 14 is open, switch 16 is open, and switch 18 is closed. Fluid amplifier 24 being of the mono-stable variety emits fluid through output leg 26, communicating said fluid flow to bias fluid amplifier 28 to leg 38. Vacuum source 84 provides a negative pressure in fluid amplifier 28 at all times when valve 74 allows fluid flow therethrough. Until dash controller 20 is opened, vacuum source 84 draws atmospheric pressure through fluid amplifier 24 into leg 30 or leg 38 of fluid amplifier 28 and on the vacuum source. The vacuum source could be, for example, the intake manifold of a vehicle.

When it is desired to initiate windshield wiper operation, dash controller 20 is actuated and simultaneously allows a bleed into fluid amplifier 28 from inlet 78, allows a certain bleed into line 72, and also closes switch 14. With switch 14 closed, a path for current flow exists through leads 86 and 88 through normally closed switch 18, through lead 90 to motor 10 and ground. Motor 10 is energized and cam 22 follows the rotation of motor 10 and immediately closes switch 16. As previously stated, cam 22 is a wiper blade position reference and rotates one revolution when the wiper blades engaging motor 10 go through one wiping cycle.

Contemporaneously with the closing of switch 14, fluid amplifier 28 has a fluid flow through valve 74. Due to a bias on fluid amplifier 28 at point 44 by fluid amplifier 24, the flow through amplifier 28 is up leg 38. This flow through leg 38 charges line 40 and bore 54 above piston 52. Piston 52 immediately starts a downward movement causing initially the opening of switch 18 by means of pin 85 and a movement of diaphragm 62 in chamber 66 toward check valves 68 and 70.

When switch 18 opens, one path for current flow to motor 10 is interrupted but while cam 22 is being rotated on the raised portion thereof, switch 16 remains closed. When cam 22 completes one revolution, follower 96 drops into groove 98 opening switch 16. Motor 10 is then deenergized with the wiper blades having completed one cycle and piston 52 being at the lower extremity of its travel.

The apparatus is so designed that, when piston 52 reaches its lower end of travel, inlet 100 to line 48 is uncovered, resulting in a bias flow to fluid amplifier 28 from inlet 42 now directly in fluid communication with inlet 100. The bias flow through line 48 at point 46 biases amplifier 28 so that the flow shifts to leg 30. Leg 30 communicates through line 32 with inlet 34 into the pressure responsive device 36. Pressure buildup under piston 52 begins and piston 52 begins travel to an opposite extreme of movement in bore 54 in the direction of inlet 42.

As piston 52 moves in bore 54, diaphragm 62 moves in chamber 66 drawing air through check valve 70. The flow through check valve 70 is through line 72, variable valve 74 and line 82. The negative pressure in leg 80 created thereby biases fluid amplifier 24 toward leg 80 removing the bias pressure in fluid amplifier 28 at point 44. It is obvious then that fluid amplifier 28 is not biased once inlet 100 is covered and diaphragm 62 begins its movement. Being a high memory bistable fluid amplifier, flow continues in leg 30 and in line 32 continuing the movement of piston 52 toward inlet 42. When this movement has been completed, the negative pressure in line 72 disappears causing mono-stable amplifier 24 to revert the fluid flow to line 26. As this occurs, a new cycle in the system is initiated.

It is obvious then that the length of time that the contacts 18 are broken after cam 22 has completed one revolution represents the delay between wipe cycles. Therefore, the rate at which fluid enters check valve 70 when diaphragm 62 moves in the direction of inlet 42 determines the length of time the switch 18 is open. The rate of entry of fluid in line 72 is controlled by the setting of dash controller 20 acting on variable valve 74. Therefore, the frequency of the pulses is directly controllable by dash controller 20 which also operates switch 14 due to a mechanical interlock.

The apparatus herein described finds particular utility in a windshield wiper system in which a pulsing capability is desired. It is obvious that the control described herein is adaptable for a multitude of functions where intermittent operation of a device is desired. The manufacture of the two types of fluid amplifiers can be accomplished very easily by well-known molding techniques utilizing plastic moldings formed in layers to provide the required passages. An infinitely variable pulse control is provided by variable valve 74 which can act to make the system shown pulse at any frequency desired.

While the embodiment of the present invention, as herein disclosed, constitutes a preferred form, it is to be understood that other forms might be adopted.

What is claimed is:

1. A pulse windshield wiping system for wiping a windshield of a vehicle comprising: a drive motor which is adapted to be intermittently energized to move a windshield wiper in opposite directions across the windshield through one cycle of operation each time it is energized; first means in an operative circuit with said drive motor and operable to control energization and de-energization of the drive motor, said first means including an element movable between first and second positions in which it effects de-energization and energization of said drive motor, respectively; fluid motor means including a member movable between first and second positions, said fluid motor means effecting movement of said element from said first postion towards said second position in response to fluid being supplied to one end thereof and for effecting movement of said element from said second position toward said first position when fluid is supplied to the other end thereof, respectively; and control means for selectively supplying fluid from a source to the opposite ends of said fluid motor means, said control means including a first fluid amplifier having an inlet and first and second outlet legs respectively connected to opposite ends of said fluid motor means, manual control means for connecting said inlet of said first fluid amplifier with a pressure source, a second monostable fluid amplifier operatively connected with said first fluid amplifier and said fluid motor, said second fluid amplifier being operable in response to movement of said member of said fluid motor means to its first position to shift the fluid stream flowing through said first fluid amplifier from its first leg to its second leg to effect movement of said element to its second position in which it effects de-energization of said drive motor and means responsive to movement of said member to its second position for rendering said second fluid amplifier inoperable to bias the fluid stream flowing through said first fluid amplifier and for shifting the fluid stream flowing through said first fluid amplifier from its second leg to its first leg, said stream of fluid when flowing through said first leg of said fluid amplifier effecting movement of said member toward its first position in which it effects energization of said drive motor.

2. A pulse windshield wiping system as defined in claim 1 wherein said drive motor is an electric motor and wherein said first means is an electric switch.

3. A pulse windshield wiping system as defined in claim 2 wherein said outlet legs of said first fluid amplifier are also in communication with a vacuum source and wherein said fluid source is air at atmospheric pressure.

4. A control apparatus for intermittently energizing an electric motor comprising: switch means in an operative electric circuit with said electric motor and which is respectively actuatable between closed and open positions to effect energization and de-energization of said motor; a pressure responsive device for effecting movement of said switch means between its positions, said pressure responsive device including first and second members reciprocably movable between first and second positions, said first member being a spring biased diaphragm and effecting closure of said switch means when in said first position and opening of said switch means when in said second position, and control means for controlling operation of said pressure responsive device to intermittently effect energization of said motor, said control means comprising a first bistable fluid amplifier having an inlet and first and second outlet legs which are in communication with the opposite sides of said second member of said pressure responsive device, a vacuum source, means for also communicating the outlet legs of said first fluid amplifier with said vacuum source, a manually manipulatable control for controlling communication between the atmosphere and said inlet of said first fluid amplifier, a second monostable fluid amplifier having an inlet in communication with the atmosphere and first and second outlet legs and with the flow of atmospheric air through the inlet normally flowing through said first outlet leg, means for communicating said first outlet leg of said second fluid amplifier to a transverse port at the first outlet leg of said first fluid amplifier so that the air stream flowing through the first fluid amplifier is biased to flow through said second outlet leg of said first fluid amplifier, means for communicating said second outlet leg of said second fluid amplifier to one side of said second member of said pressure responsive device, said air when passing through said second outlet leg of said first fluid amplifier causing said members of said pressure responsive device to be moved from their first position toward their second position to effect opening of said switch means, means for allowing air to be expelled from one side of said second member of said pressure responsive device when said second member is moved from its first position toward its second position, means for directing the air flow from said second outlet leg of said first fluid amplifier to a port at the second leg thereof to effect a shifting of the fluid stream from the second outlet leg to the first outlet leg when said second member of said pressure responsive device is in its second position whereby said first member is caused to be moved toward its first position, said second member being movable toward its first position by drawing air from the second outlet leg of said second fluid amplifier when the first member is being moved toward its first position and thereby causing a shifting of the fluid stream from the first outlet leg to the second leg of the second fluid amplifier, when said second member reaches its first position the fluid stream is automatically shifted back to the first outlet leg of the second fluid amplifier which in turn effects a shifting of the fluid stream from the first to the second outlet leg of the first fluid amplifier to initiate a new cycle of operation, and means for controlling the rate at which air is bled into the pressure responsive device when the first member is moving toward its first position.

5. A control apparatus as defined in claim 4 wherein said motor drives a windshield wiper of a windshield cleaning system.

References Cited

UNITED STATES PATENTS

| | | | |
|---|---|---|---|
| 3,110,056 | 11/1963 | Oishei et al. | 15—250.12 |
| 3,181,546 | 5/1965 | Boothe | 137—81.5 |
| 3,234,934 | 2/1966 | Woodward | 91—3 |

WALTER A. SCHEEL, *Primary Examiner.*

R. I. SMITH, *Assistant Examiner.*

U.S. Cl. X.R.

137—81.5